(12) United States Patent
Ueno et al.

(10) Patent No.: US 8,890,492 B2
(45) Date of Patent: Nov. 18, 2014

(54) AUTOMATIC START/STOP DEVICE FOR ENGINE-DRIVEN POWER GENERATOR

(75) Inventors: Masanori Ueno, Saitama (JP); Makoto Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 652 days.

(21) Appl. No.: 13/099,000

(22) Filed: May 2, 2011

(65) Prior Publication Data

US 2011/0271927 A1 Nov. 10, 2011

(30) Foreign Application Priority Data

May 7, 2010 (JP) .................................. 2010-107248

(51) Int. Cl.
*H02P 11/00* (2006.01)
*H02P 9/00* (2006.01)

(52) U.S. Cl.
USPC .............................. 322/24; 322/28; 290/40 B

(58) Field of Classification Search
CPC ............ H02P 9/14; F01D 15/10; Y02E 20/14
USPC ..................... 290/40 B, 2; 322/24, 28, 20, 44
See application file for complete search history.

(56) References Cited

U.S. PATENT DOCUMENTS

| | | | |
|---|---|---|---|
| 3,456,120 A | | 7/1969 | Martin |
| 4,590,384 A | * | 5/1986 | Bronicki ........................ 290/4 C |
| 4,661,760 A | * | 4/1987 | Goto et al. ........................ 322/27 |
| 4,749,944 A | * | 6/1988 | Okamoto .................. 324/765.01 |
| 5,801,516 A | * | 9/1998 | Rice et al. ........................ 322/37 |
| 6,111,390 A | * | 8/2000 | Inaba et al. ..................... 322/28 |
| 6,175,217 B1 | * | 1/2001 | Da Ponte et al. ................ 322/19 |
| 7,956,584 B2 | * | 6/2011 | Peterson et al. ................. 322/44 |
| 2004/0008009 A1 | * | 1/2004 | Fukaya ........................... 322/44 |
| 2006/0284843 A1 | * | 12/2006 | Endou et al. .................. 345/161 |
| 2008/0116695 A1 | * | 5/2008 | Peterson ...................... 290/40 |
| 2008/0197630 A1 | * | 8/2008 | Wakitani et al. .................. 290/2 |
| 2011/0261597 A1 | * | 10/2011 | Ueno et al. ...................... 363/37 |

FOREIGN PATENT DOCUMENTS

| | | |
|---|---|---|
| CN | 101636900 A | 1/2010 |
| FR | 2 622 750 A1 | 5/1989 |
| JP | 2882174 B2 | 4/1999 |
| JP | 2004-282827 A | 10/2004 |
| WO | WO 2008/063580 A2 | 5/2008 |

OTHER PUBLICATIONS

European Search Report from European Application No. 11 16 4610 dated Feb. 22, 2012.

* cited by examiner

*Primary Examiner* — Julio Cesar Gonzalez
(74) *Attorney, Agent, or Firm* — Westerman, Hattori, Daniels & Adrian, LLP

(57) ABSTRACT

Starting and stopping an engine is automatically controlled based on a load without using a relay. An inverter engine-driven power generator has an alternator, a rectifying circuit, a DC/DC converter, and an inverter circuit. A load detection circuit is connected to an output of the inverter circuit in parallel. A load detection line of the load detection circuit is connected to an output line of the inverter circuit in parallel via resistors. A power supply formed of a battery is connected to the load detection line. A decision circuit outputs a load detection signal when a current having a preset value or more flows through the load detection line. A drive/stop CPU starts the engine in response to the load detection. The resistors are set at a resistance value which does not influence a load to which a generator output is supplied.

6 Claims, 6 Drawing Sheets

AUTOMATIC START/STOP DEVICE FOR ENGINE-DRIVEN POWER GENERATOR

TECHNICAL FIELD

The present invention relates to an automatic star/stop device for an engine-driven power generator, and particularly to an automatic start/stop device for an engine-driven power generator capable of automatically starting or stopping an engine depending on the presence of a load.

BACKGROUND ART

There is known an inverter engine-driven power generator in which an output of an engine-driven power generator is rectified in a rectifying circuit and is converted into an AC output having a predetermined frequency in an inverter circuit to supply a power to a load. For example, Japanese Patent Application Laid-Open No. 2004-282827 discloses an inverter power generator in which a bidirectional DC/DC converter is provided between an output side of the rectifying circuit and an output terminal of a battery, and if the output of the rectifying circuit is lacking during an overload state, the lacking output from the rectifying circuit can be supplied from the battery.

Since the inverter power generator can change its frequency depending on the load, the engine is operated in the idle state while the load is absent, thereby enhancing low-fuel consumption and low-noise performance. However, it is desired that the engine is stopped when the load is absent to further enhance low-fuel consumption and low-noise performance. On the other hand, it is complicated for an operator of the load to stop the engine each time the load stops being driven, and thus there is desired a system capable of detecting the stop of the load and automatically stopping the engine particularly while the operator is operating or driving the load at a distant place from the power generator.

A means for detecting the presence of the load is required for automatically stopping the engine. There is proposed in Japanese Patent Publication No. 2882174 a start/stop control device for an engine-driven power generator in which when the engine frequency is less than a set value, a connection is switched from a load connection terminal to a load detection power supply circuit, when a load is connected to the load connection terminal, a current flows from the load detection power supply circuit to the load, and when the current is larger than the set value, the engine is started.

CITATION LIST

Patent Literature

Patent Literature 1 "Japanese Patent Application Laid-Open No. 2004-282827"
Patent Literature 2 "Japanese Patent Publication No. 2882174"

SUMMARY OF INVENTION

Technical Problem

In the device described in Japanese Patent Publication No. 2882174, a relay is used to switch a system for connecting an output of an alternator driven by the engine to the load connection terminal and a system for connecting the load detection power supply circuit to the load connection terminal. Thus, when a generator voltage of the alternator is high, a relay having a large capacity according to a current flowing due to the voltage is required, which causes problems on layout or cost of the large-sized relay.

It is an object of the present invention to provide an automatic start/stop device for an engine-driven power generator capable of detecting the presence of a load without using a relay in order to solve the above problems.

Solution to Problem

A first feature of the present invention is an automatic start/stop device for an engine-driven power generator which has an alternator driven by an engine, a rectifier for rectifying an output of the alternator, a DC/DC converter for converting a DC voltage output from the rectifier, and an inverter for converting an output of the DC/DC converter into an AC output to be a generator output, comprising: a load detection circuit connected to an output line of the inverter in parallel, wherein the load detection circuit includes a load detection line connected to the output line of the inverter in parallel via a resistor, a power supply circuit for applying a voltage to the load detection line, and a decision circuit for, when a current having a preset value or more flows through the load detection line, outputting a load detection signal, and the resistor is set at a resistance value which does not influence a load to which the generator output is supplied.

A second feature of the present invention is the automatic start/stop device for an engine-driven power generator wherein the engine automatically starts in response to the load detection signal output from the load detection circuit.

A third feature of the present invention is the automatic start/stop device for an engine-driven power generator wherein the engine automatically stops and the inverter stops being operated in response to an output stop of the load detection signal output from the load detection circuit while the engine is being driven.

A fourth feature of the present invention is the automatic start/stop device for an engine-driven power generator wherein the power supply circuit forms a power supply from a battery in an independent system from a power generator system by the alternator such that a load state can be always being monitored irrespective of whether the engine is being operated or stopped.

A fifth feature of the present invention is the automatic start/stop device for an engine-driven power generator comprising a mode switch for energizing or de-energizing the load detection circuit.

A sixth feature of the present invention is the automatic start/stop device for an engine-driven power generator comprising: a converter for boosting an output voltage of the battery, wherein an output side of the converter is connected to an input side of the inverter to be hybrid.

A seventh feature of the present invention is the automatic start/stop device for an engine-driven power generator wherein the alternator serves also as a starter motor which is started by a power supplied from the battery.

Advantageous Effects of Invention

According to the present invention having the above features, a minute current flows through the load detection line via a voltage applied from the power supply to the load detection line connected to the output line via a high resistor. Since the current does not flow through an open circuit to which the load is not connected, the presence of the load can be determined depending on whether the current flows at a predetermined value or more. Since the load detection circuit is always connected to the output line, a relay having a large current capacity is not required for disconnecting the load detection circuit.

According to the present invention having the second feature, the load can be detected to automatically start the engine, thereby generating a power. According to the present invention having the third feature, the absence of the load is detected to automatically stop the engine, thereby stopping generating a power.

According to the present invention having the fourth feature, since the power supply is formed of the battery, the load detection circuit can be always operated to automatically drive or stop the engine depending on the presence of the load.

According to the present invention having the fifth feature, when an operator is working near the power generator, he/she operates a mode switch to drive/stop the engine not by the load detection device but manually, thereby setting the load detection device non-energized, and when the operator is working away from the power generator, he/she can energize the load detection device to automatically drive/stop the engine.

According to the present invention having the sixth feature, also in the hybrid engine-driven power generator, the drive/stop of the engine can be automatically controlled depending on the presence of the load.

According to the present invention having the seventh feature, a voltage is applied from the battery to the alternator to operate the alternator as a starter, thereby starting the engine.

DESCRIPTION OF EMBODIMENTS

Figure 1:
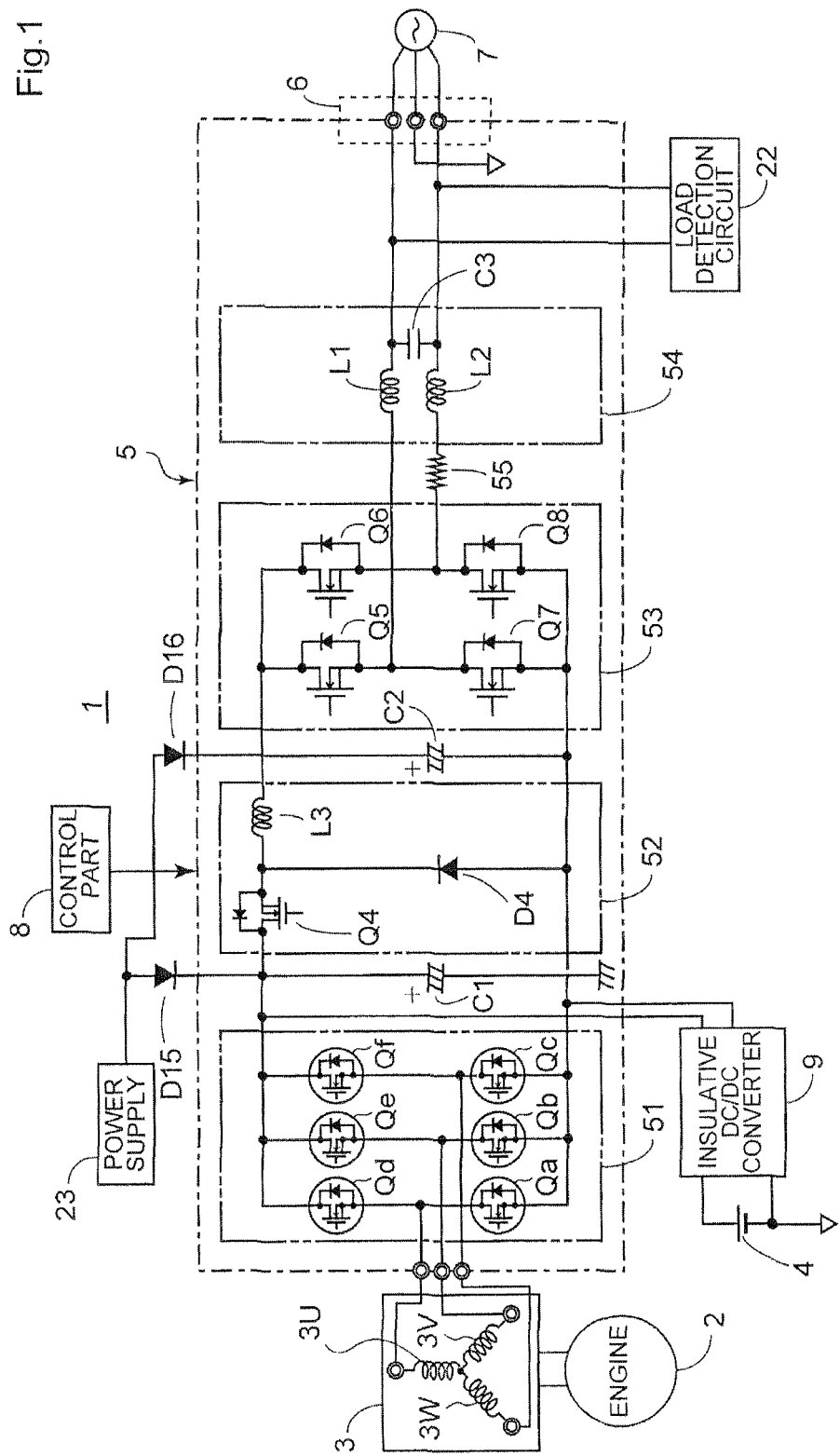
FIG. 1 is a block diagram showing a system structure of an inverter engine-driven power generator according to one embodiment of the present invention.

One embodiment of the present invention will be described below with reference to the drawings. FIG. 1 is a system structure diagram of an inverter engine-driven power generator according to one embodiment of the present invention. In FIG. 1, the inverter engine-driven power generator 1 has an alternator 3 driven by an engine 2. The alternator 3 is formed of a 3-phase multipolar magnet power generator, for example. An output side of the alternator 3 is connected to an output control device 5. The output control device 5 is formed of a rectifying circuit 51, a DC/DC converter 52, an inverter circuit 53 and a waveform shaping circuit 54.

The rectifying circuit 51 is a hybrid bridge rectifying circuit having bridge-connected switching devices (which will be described as "FET" below) Qa, Qb, Qc, Qd, Qe, Qf. A 3-phase winding 3U, a 3-phase winding 3V and a 3-phase winding 3W are connected to a coupling point between the FETQd and the FET Qa, a coupling point between the FET Qe and the FET Qb, and a coupling point between the Qf and the FET Qc, respectively.

The thus configured rectifying circuit 51 rectifies and supplies the output of the alternator 3 to the inverter circuit 53, and functions as a drive inverter for converting a DC output voltage of the battery 4 into a 3-phase AC voltage and applying the 3-phase AC voltage to the alternator 3.

The DC/DC converter 52 is a voltage reduction circuit for outputting a stable DC voltage, which includes a switching device (FET) Q4, a choke coil L3 and a diode D4 and is connected at an input side and an output side with capacitors C1 and C2 in parallel, respectively. The inverter circuit 53 is formed by bridge-connecting four FETs Q5, Q6, Q7 and Q8. The waveform shaping circuit 54 is formed of coils L1, L2 and a capacitor C3.

The FET Q4 of the DC/DC converter 52 and the FETs Q5 to Q8 of the inverter circuit 53 are PWM-controlled by a control part 8. For the DC/DC converter 52, charges (energy) are accumulated in the choke coil L3 and the capacitor C2 by a voltage input from the rectifying circuit 52 while the FET Q4 is being powered on. Then, when the FET Q4 is powered off, a current flows through the diode D4 due to the accumulated energy. An output voltage of the DC/DC converter 52 is reduced depending on a duty ratio of the FET Q4.

The inverter circuit 53 converts an input voltage into an AC voltage having a predetermined frequency (such as commercial power frequency) and inputs the AC voltage into the waveform shaping circuit 54. The waveform shaping circuit 54 is connected to an output terminal (such as outlet) 6 for extracting a generator output to the outside. A load 7 is connected to the outlet 6. A resistor 55 for detecting a load current is provided between the inverter circuit 53 and the waveform shaping circuit 54.

The battery 4 is connected to an input side (primary side) of an insulative DC/DC converter 9 and an output side (secondary side) of the insulative DC/DC converter 9 is connected to an input side of the inverter circuit 53.

A load detection circuit 22 is connected to an output side of the waveform shaping circuit 54, that is, an output terminal of the inverter engine-driven power generator 1. A power supply 23 is connected to the output control device 5 via diodes D15, D16. The power supply 23 is formed of the battery 4 (its circuit diagram will be shown below).

Figure 2:
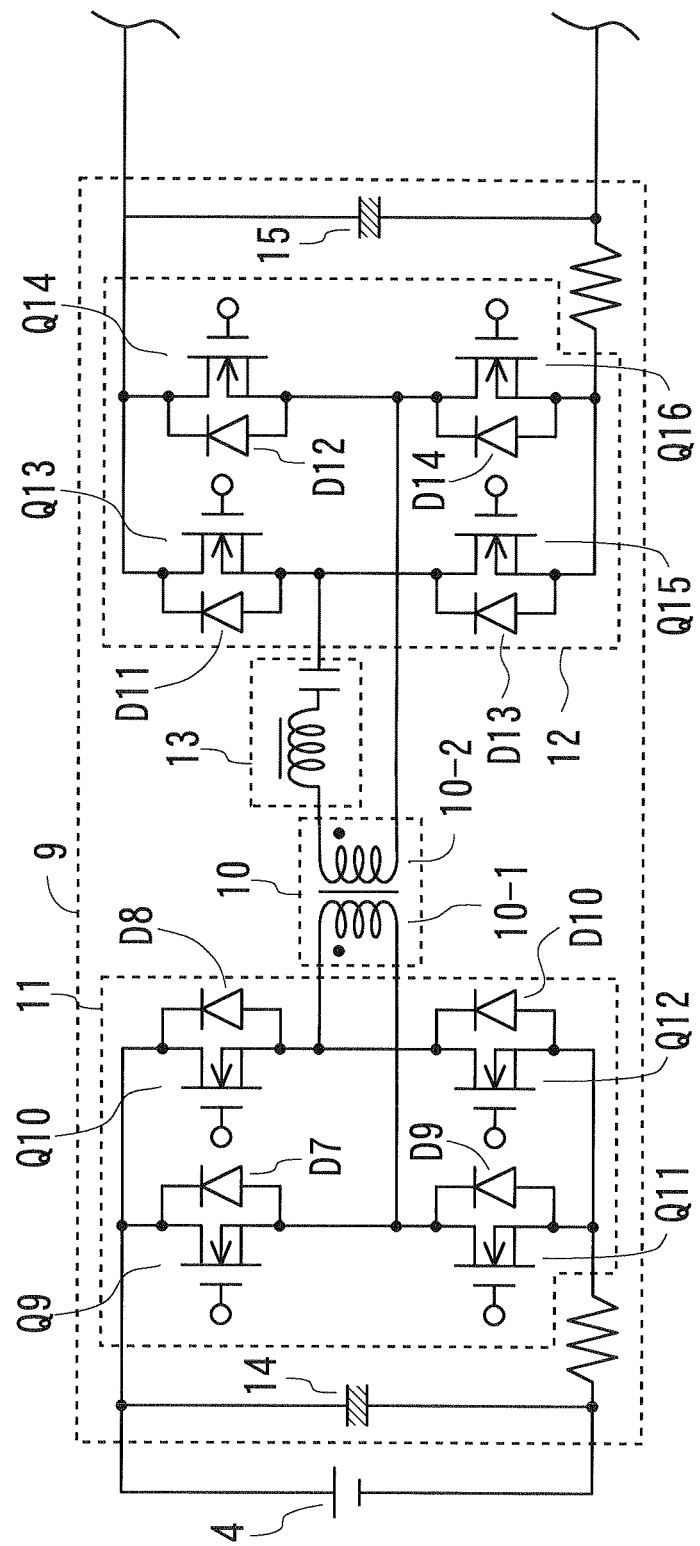
FIG. 2 is a specific circuit diagram of an insulative DC/DC converter.

FIG. 2 is a circuit diagram showing a structure example of the insulative DC/DC converter 9. The insulative DC/DC converter 9 includes a transformer 10 including a low voltage side winding 10-1 at the primary side and a high voltage side winding 10-2 at the secondary side.

A low voltage side switching part 11 is connected to the low voltage side winding 10-1 and a high voltage side switching part 12 is connected to the high voltage side winding 10-2. The low voltage side switching part 11 is configured, for example, by bridge-connecting four FETs Q9, Q10, Q11 and Q12, and the high voltage side switching part 12 is also formed by bridge-connecting four FETs Q13, Q14, Q15 and Q16 similarly.

The FETs Q9 to Q16 of the low voltage side switching part 11 and the high voltage side switching part 12 are connected with diodes D7, D8, D9, D10 and D11, D12, D13, D14 in parallel, respectively. These diodes may be parasitic diodes of the FETs or additionally-connected diodes. The low voltage side switching part 11 and the high voltage side switching part 12 may be assumed as a switching/rectifying part in a combination of the rectifying devices D7 to D14 connected in parallel.

A LC resonance circuit 13 is inserted into the high voltage side winding 10-2 of the transformer 10. The LC resonance circuit 13 functions to make a current flowing when at least one of the low voltage side switching part 11 and the high voltage side switching part 12 is driven into a sinusoidal wave form, to reduce a switching loss, and not to cause FET breakdown due to a large current. This is because the FETs can be powered on or off near the zero cross point of the current in a sinusoidal wave form. The LC resonance circuit 13 may be provided at the primary side not at the secondary side.

The FETs Q9 to Q12 of the low voltage side switching part 11 and the FETs Q13 to Q16 of the high voltage side switching part 12 are controlled for their switching by the control part 8. Capacitors 14, 15 connected to the primary side and the secondary side are output smoothing capacitors.

The low voltage side switching part 11 and the high voltage side switching part 12 are driven by the same signal to be completely synchronized with each other such that the insulative DC/DC converter 9 automatically performs power conversion bidirectionally. Such driving is performed by alternately powering on and off a pair of FETs Q9 and Q12 and a pair of FETs Q10 and Q11 in the low voltage side switching part 11 and alternately powering on and off a pair of FETs Q13 and Q16 and a pair of FETs Q14 and Q15 in the high voltage side switching part 12, as well known.

When the engine 2 is started, the alternator 3 is driven by the engine to generate an output. The output of the alternator 3 is rectified by the diodes D1 to D3 of the rectifying circuit 51. The output voltage of the rectifying circuit 51 is adjusted at a low voltage by the DC/DC converter 52 and is further converted into an AC power in the inverter circuit 53.

Since the insulative DC/DC converter 9 is a bidirectional DC/DC converter, if the remaining amount of the battery 4 is less than a predetermined value and the output of the alternator 3 is efficient, the output voltage of the rectifying circuit 51 is reduced in the insulative DC/DC converter 9 to be inputted into the battery 4, thereby charging the battery 4. When the remaining amount of the battery 4 is large, a power is supplied to the load even from the battery 4 via the insulative DC/DC converter 9 in order to compensate for (assist) the output power of the alternator 3.

Figure 3:
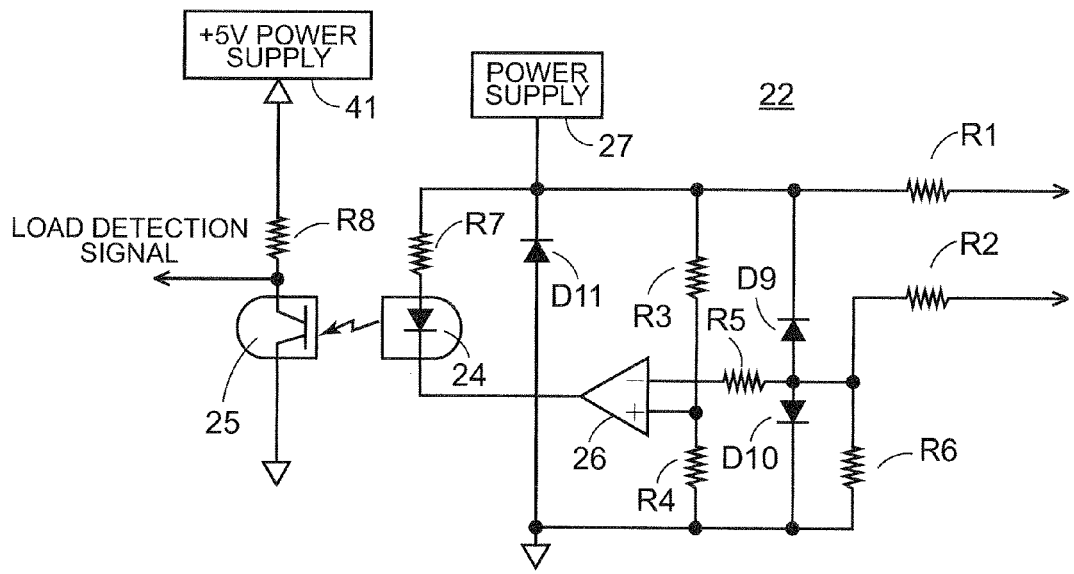
FIG. 3 is a circuit diagram showing a specific example of a load detection circuit.

FIG. 3 is a circuit diagram showing a specific example of the load detection circuit 22. The load detection circuit 22 has resistors R1, R2, and is connected to an output line of the engine-driven power generator 1 via the resistors R1, R2. The resistors R1, R2 of the load detection circuit 22 are selected to have a high resistance value (such as 100 kΩ) such that a power given from a power supply 27 to the load detection circuit 22 is enough not to influence the generator output supplied to the load 7. The load detection circuit 22 includes a primary side circuit and a secondary side circuit which are insulated from each other by a light emitting diode 24 and a phototransistor 25.

The primary side circuit includes a comparator 26, and divides a generator output voltage input via the resistors R1, R2 by resistors R3, R4 to be connected to a plus input terminal of the comparator 26. The generator output voltage input via the resistors R1, R2 is adjusted by resistors R5, R6 and is connected to a minus input terminal of the comparator 26. The diodes D9, D10 for preventing back flow are connected to the resistor R5. An output side of the comparator 26 is connected to a cathode of the light emitting diode 24.

The power supply 27 (its circuit diagram will be shown below) formed of the battery 4 is connected to the load detection circuit 22. The diode 11 is for preventing back flow toward the power supply 27. A resistor R7 is connected between an anode of the light emitting diode 24 and the resistor R1.

An input resistor R8 is connected to a collector of the phototransistor 25 constituting the secondary side circuit of the load detection circuit 22. A connection point between the resistor R8 and the phototransistor 25 is connected to an input terminal of the control part of the engine-driven power generator mechanism drive/stop device (hereinafter referred to as "drive/stop CPU"), and a load detection signal is inputted.

Figure 4:
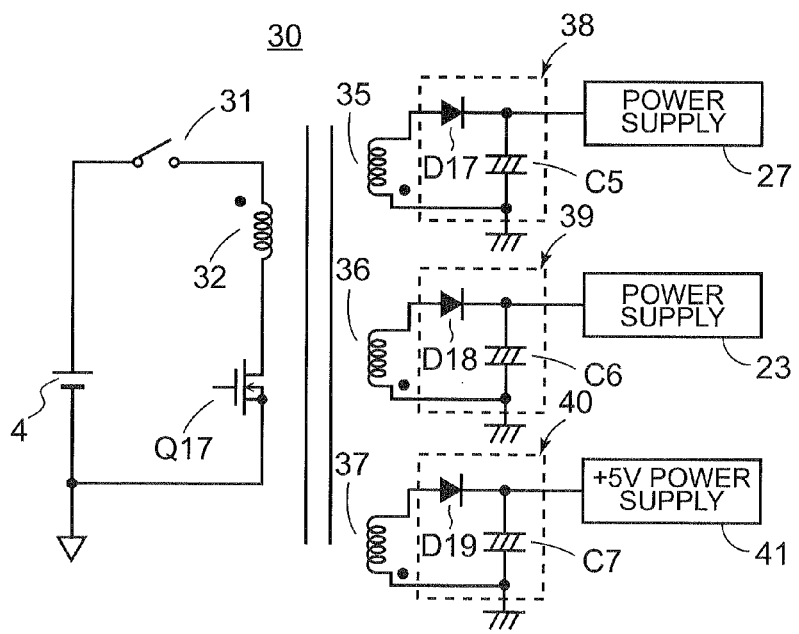
FIG. 4 is a circuit diagram showing a specific example of a power supply unit formed of a battery voltage.

FIG. 4 is a circuit diagram showing a specific example of a power supply circuit. The power supply circuit 30 has a primary side which is formed by connecting the battery 4, a mode switch 31, a choke coil 32 and a FET Q17 in series. A secondary side of the power supply circuit 30 has coils 35, 36 and 37 which are arranged opposite to the choke coil 32. The coil 35 is connected to a half-wave rectification smoothing circuit 38 formed of a diode D17 and a smoothing capacitor C5, the coil 36 is connected to a half-wave rectification smoothing circuit 39 formed of a diode D18 and a smoothing capacitor C6, and the coil 37 is connected to a half-wave rectification smoothing circuit 40 formed of a diode D19 and a smoothing capacitor C7. An output of the half-wave rectification smoothing circuit 38 is connected to the primary side circuit of the load detection circuit 22 as the power supply 27. An output of the half-wave rectification smoothing circuit 39 is connected to the output control circuit 5 as the power supply 23. An output of the half-wave rectification smoothing circuit 40 is connected to the secondary side of the load detection circuit 22 as a +5V power supply 41.

When the mode switch 31 is powered on, a current flows through the choke coil 32 and a voltage is generated. The voltage can be controlled by a duty of a drive pulse (PWM signal) applied to the FET Q17.

A current flows through the coils 35, 36 and 37 depending on a winding ratio relative to the choke coil 32 and a voltage is generated. A voltage generated in each coil 35 to 37 is rectified in the diode D17 to D19, and is smoothed and outputted in the capacitor C5 to C7, respectively.

The load detection circuit 22 operates as follows. Since the circuit containing the resistors R1, R2 is an opened circuit while the load is not being operated, a current does not flow through the primary side of the load detection circuit 22. On the other hand, when the load is connected, the resistors R1, R2 are connected via the load so that the load detection circuit 22 forms a closed circuit. In this way, a minute current flows through the resistors R1, R2 having a large resistance value by the voltage applied from the power supply 27, and the light emitting diode 24 is powered on. Thus, the phototransistor 25 is powered on. When the phototransistor 25 is powered on, a current flows through the phototransistor 25 by the voltage of the power supply (+5V power supply) 41. Since a voltage connected to an input terminal of the drive/stop CPU is reduced due to the current, the CPU detects a change in voltage and senses that the load has been driven.

Since the FETs Q5 to Q8 of the inverter circuit 53 incorporate the diodes, respectively, when the voltage of the power supply 23 is higher than the incorporated diodes of the FETs Q5 to Q8, the capacitors C1, C2 of the DC/DC converter 52 are charged by the voltage of the power supply 23. A charge potential of the capacitors C1, C2 is set to be higher than the voltage applied from the power supply 23 such that the capacitors C1, C2 are not charged by the power supply 23.

Figure 5:
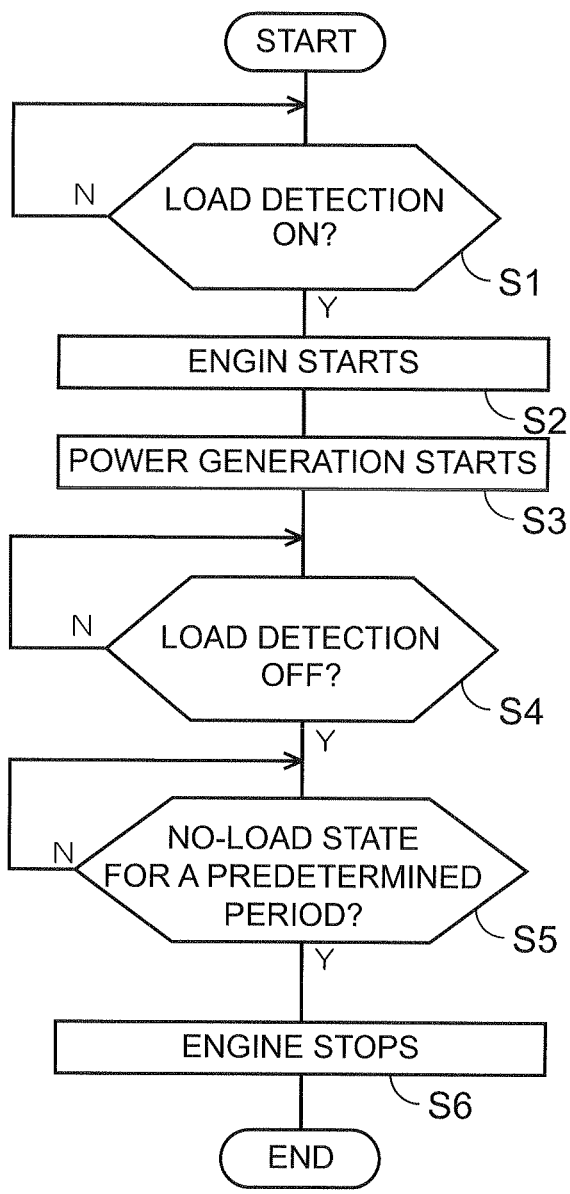
FIG. 5 is a flowchart showing the operations of the load detection circuit.

The engine start/stop control will be described with reference to a flowchart of FIG. 5. The flowchart of FIG. 5 starts when the mode switch 31 is powered on, that is, in response to power-on of the control power supplies 23, 24 and 41. The mode switch 31 is a switch for selecting a local mode of manually starting (or stopping) the engine 2 during the load connection and a remote mode of detecting a load operation and automatically starting (or stopping) the engine.

When the mode switch 31 is powered on to be the remote mode, in step S1, the load detection circuit 22 starts to operate due to the voltage of the power supply 27 and a decision is made as to whether the load detection circuit 22 has sensed the load operation. When the load operation is detected by the load detection circuit 22, the engine 2 is started in step S2. In other words, the insulative DC/DC converter 9 is operated to apply the voltage of the battery 4 to the rectifier 51, and the FETs Q1 to A3 of the rectifier 51 are driven to supply a current to the coils 3U, 3V and 3W of the alternator 3. Thus, the alternator 3 is driven as a starter motor of the engine 2 to start the engine 2.

When the frequency of the engine 2 reaches a completion frequency (predetermined frequency for engine starting completion), the processing proceeds to step S3, where power generation is started. In other words, the FETs Q5 to Q8 are driven to start outputting a generator power. In step S4, it is decided either that the load is not detected by the load detection circuit 22 or that a current measurement resistor 55 detects that the load current is zero. When an affirmation is taken in step S4, that is, when it is decided that the load is not operated (that is, no load is present), the processing proceeds to step S5. In step S5, a determination is made as to whether the no-load state lasts for a predetermined period of time (such as three seconds). If an affirmation is taken in step S5, the processing proceeds to step S6, where the engine 2 is stopped.

As far as the mode switch 31 is not powered off, the state in which a voltage is being applied from the power supplies 27, 23, 41 by the battery 4 remains also after the engine 2 is stopped, and thus the load detection circuit 22 continuously monitors the presence of the load.

Figure 6:
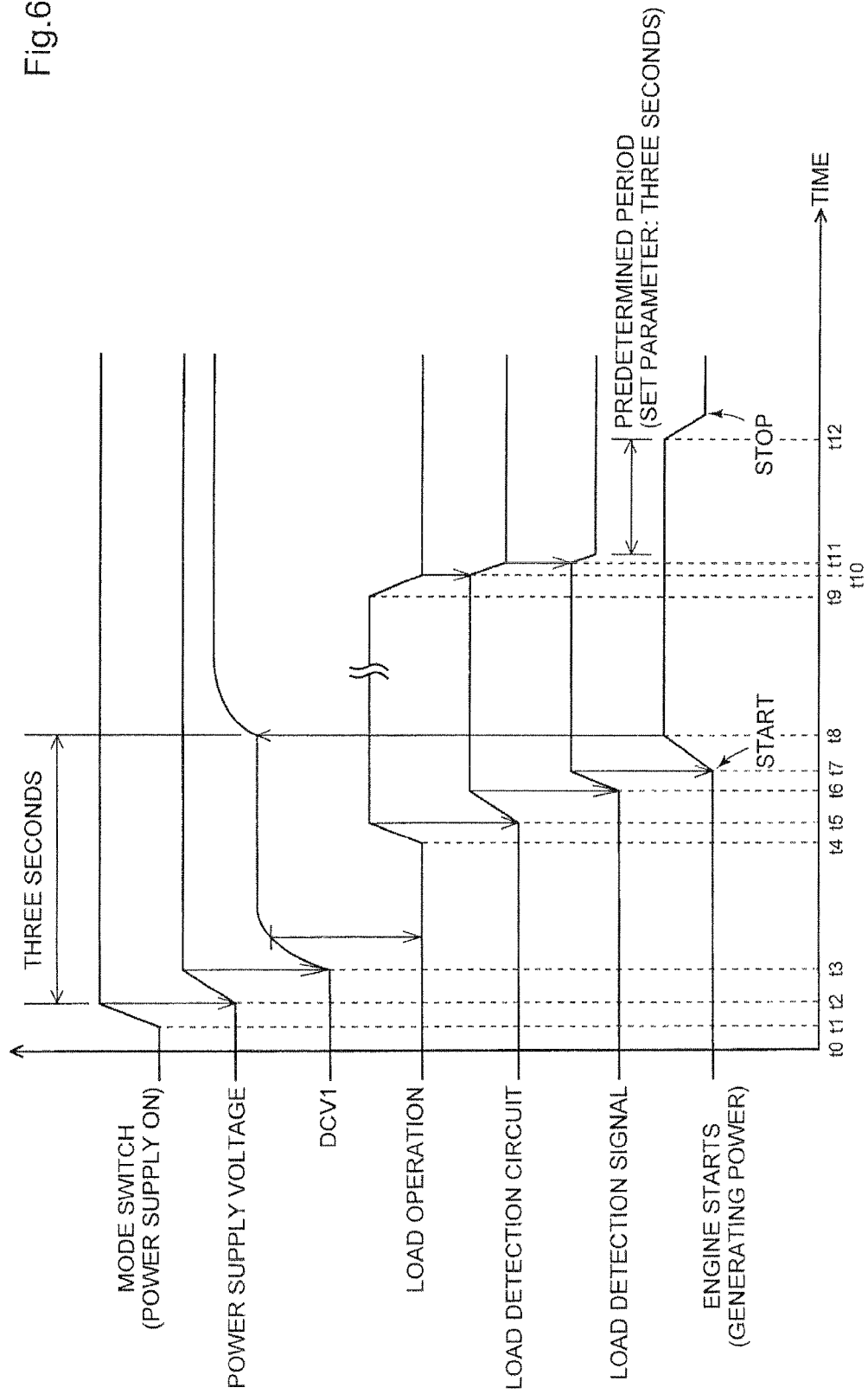
FIG. 6 is a timing chart corresponding to the operations of the load detection circuit.

FIG. 6 is a timing chart of the engine start control. When the mode switch 31 is powered on at timing t1 and the power supplies 27, 23, 41 rise at timing t2, an output voltage DCV1 of the rectifying circuit 51 increases at timing t3. The load is operated at timing t4. In other words, the load 7 is connected to the outlet 6 so that an operation (such as switch-on) for driving the load is performed. The load detection circuit 22 is started to operate at timing t5. At timing t6, the load detection circuit 22 detects the load operation and the load detection signal is powered on. The load detection signal is inputted into the drive/stop CPU. At timing t7, the engine 2 is started. When the engine 2 is started at timing t7, the output voltage DCV1 further increases at timing t8.

At timing t9, when the load current reaches zero or a plug of the load 7 is removed from the outlet 6, the load detection circuit 22 is operated at timing t10 and the load detection signal is powered off at timing t11. When the load detection signal is powered off and the off state lasts for a preset period of time (such as three seconds) from timing t11, the engine 2 is stopped at timing t12.

Figure 7:
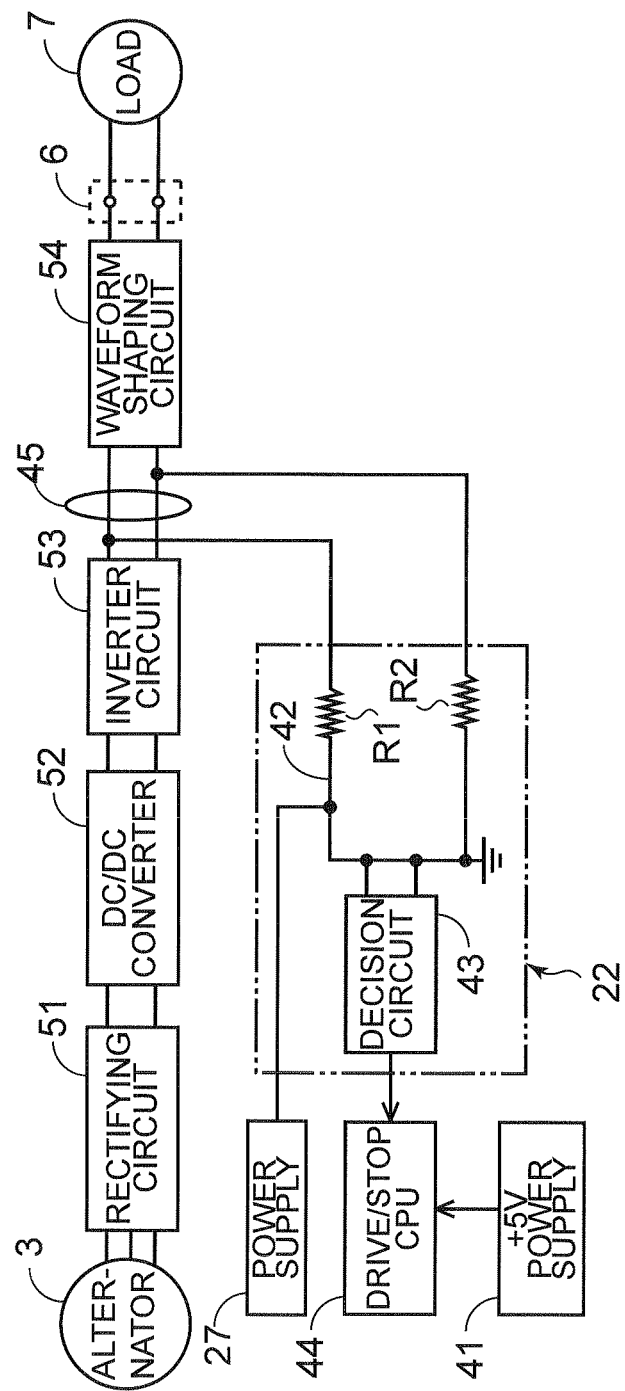
FIG. 7 is a block diagram showing essential structures of engine drive/stop control based on load detection.

FIG. 7 is a block diagram showing essential parts of the load detection circuit 22. The load detection circuit 22 is connected to an output line 45 of the inverter circuit 53 in parallel. A load detection line 42 is connected to the output line 45 of the inverter circuit in parallel via the resistors R1, R2. The power supply 27 is connected to the load detection line 42 to apply a voltage to the load detection circuit 22. A decision circuit 43 (including the comparator 26) monitors a current flowing through the load detection line 42, and outputs a load detection signal when a current having a predetermined reference value or more flows. Since the current flowing through the load detection line 42 decreases due to the high resistors R1, R2, the reference value of the current is set at a very small value corresponding to the minute current flowing through the load detection line 42. A drive/stop CPU 44 starts the engine 2 in response to the load detection signal outputted from the decision circuit 43, and stops the engine 2 in response to the disappearance of the load detection signal. Since a voltage from the power supply formed of the battery 4 is always being applied to the load detection circuit 22 and the drive/stop CPU 44, the load is continuously monitored even while the engine 2 is being stopped.

The present invention has been described with reference to the embodiment, but the present invention is not limited to the embodiment and modification may be made based on the items described in claims and well-known techniques. For example, the boosted/reduced voltage converter 52 according to the present embodiment may be applied to the hybrid engine-driven power generator including not only the alternator 3 as a power supply source driven by the engine but also the battery as a second power supply source.

REFERENCE SIGNS LIST

1 . . . inverter engine-driven power generator
2 . . . engine
3 . . . alternator
4 . . . battery
5 . . . output control device
7 . . . load
8 . . . control part
9 . . . insulative DC/DC converter
22 . . . load detection circuit
26 . . . comparator
27 . . . power supply
31 . . . mode switch
43 . . . decision circuit
44 . . . drive/stop CPU
45 . . . output line
51 . . . rectifying circuit
53 . . . inverter circuit

The invention claimed is:

1. An automatic start/stop device for an engine-driven power generator which includes an alternator driven by an engine, a rectifier for rectifying an output of the alternator, a DC/DC converter for converting a DC voltage output from the rectifier, and an inverter for converting an output of the DC/DC converter into an AC output to be a generator output, the engine-driven power generator further including an output terminal to connect a load, the inverter including an output line connected to the output terminal, the automatic start/stop device comprising:

a load detection circuit connected to the output line of the inverter in parallel, and configured to detect connection and disconnection of the load to the output terminal of the generator, wherein the load detection circuit includes a load detection line connected to the output line of the inverter in parallel via a resistor, a power supply circuit for applying a voltage to only the load detection line, and a decision circuit for, when a current having a preset value or more flows through the load detection line due to occurrence of a closed circuit by the connection of the load to the output terminal, outputting a load detection signal, the resistor is set at a high resistance value which does not influence the load to which the generator output is supplied, and the power supply circuit forms a power supply from a battery in an independent system from a power generator system by the alternator such that the power supply circuit applies the voltage to the load detection line while the engine is stopped.

2. The automatic start/stop device for an engine-driven power generator according to claim 1, wherein the engine automatically starts in response to the load detection signal output from the load detection circuit.

3. The automatic start/stop device for an engine-driven power generator according to claim 1, wherein the engine automatically stops and the inverter stops being operated in response to an output stop of the load detection signal output from the load detection circuit while the engine is being driven.

4. The automatic start/stop device for an engine-driven power generator according to claim 1, further comprising a mode switch for energizing or de-energizing the load detection circuit.

5. The automatic start/stop device for an engine-driven power generator according to claim 1, further comprising:
   a converter for boosting an output voltage of the battery,
       wherein an output side of the converter is connected to an input side of the inverter to be hybrid.

6. The automatic start/stop device for an engine-driven power generator according to claim 1, wherein the alternator serves also as a starter motor which is started by a power supplied from the battery.

* * * * *